Figure 1:
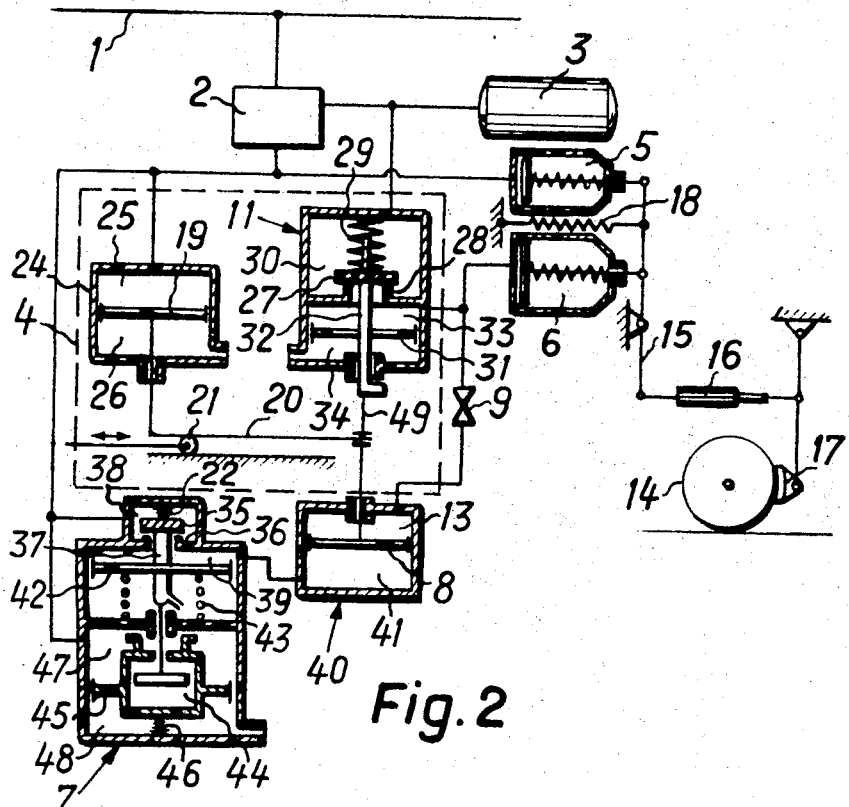

United States Patent
Keller

[11] 3,727,994
[45] Apr. 17, 1973

[54] AUTOMATIC LOAD DEPENDENT COMPRESSED AIR BRAKE SYSTEM

[75] Inventor: Siegfried Keller, Effretikon, Switzerland

[73] Assignee: Werkzeugmaschinenfabrik Oerlikon-Buhrle AG, Zurich, Switzerland

[22] Filed: Mar. 5, 1971

[21] Appl. No.: 121,505

[30] Foreign Application Priority Data

Apr. 10, 1970 Switzerland..........................5328/70

[52] U.S. Cl...................................303/23, 303/22 R
[51] Int. Cl...............................................B60t 8/18
[58] Field of Search..................303/22 A, 22 R, 23, 303/23 A; 188/195

[56] References Cited

UNITED STATES PATENTS 3,588,194   6/1971   Muller et al............................303/23

*Primary Examiner*—Milton Buchler
*Assistant Examiner*—John J. McLaughlin
*Attorney*—Wenderoth, Link & Ponack

[57] ABSTRACT

An automatic compressed air brake system for a vehicle the operation of which is dependent on the vehicle load includes brake cylinders for an unladen and for a loaded vehicle connected to a common spring restored actuating linkage. The load brake cylinder is connected to a pressure transmitter controlled by the vehicle load and the unladen brake cylinder pressure. A pressure limiting valve is connected to a control valve connected to the main brake line to control the charging of the load brake cylinder. This device generates an initial pressure for overcoming the restoring force of the linkage irrespective of vehicle load. Means are provided to relax the pressure in the load brake cylinder after the brake has initially responded. These means can exhaust the load brake cylinder and are controlled by the load brake cylinder pressure. The means disclosed are a hollow tappet in the limiting valve which is coupled by a lost motion coupling to a piston subject to the load brake cylinder pressure.

4 Claims, 2 Drawing Figures

SIEGFRIED KELLER, Inventor

By Wenderoth Lind & Ponack
Attorneys 3,727,994

AUTOMATIC LOAD DEPENDENT COMPRESSED AIR BRAKE SYSTEM

This invention relates to an automatic load dependent compressed air brake system particularly for railway vehicles of the type comprising a brake cylinder for braking the unladen vehicle and a load brake cylinder acting on the same brake actuating linkage as the unladen brake cylinder and connected to a pressure transmitter controlled by the vehicle load and by the pressure in the unladen brake cylinder.

More specifically this invention relates to an improvement of a system of the type disclosed in copending application Ser. No. 860,233 now U.S. Pat. No. 3,588,194. The purpose of that system is to improve a known compressed air brake of the specified type. In this known compressed air brake system for railway wagons of minimum tare weight and maximum load carrying capacity the brake load prescribed for all classes of wagons by international regulations can be easily reached at full braking effort for all laden weights. However, when the brake initially responds — i.e. when the brake cylinder pressure is approximately 0.8 kg/sq. cm — the brake block pressures attained in this prior art two-cylinder brake system in the case of an empty vehicle are substantially less than when the vehicle is fully loaded. These lower brake block pressures are due to the differential action of the restoring spring in the linkage and brake linkage adjusters when the vehicle is unladen and when it is fully loaded. When the brake initially responds the brake block pressure should be 6 to 15 percent of the brake shoe pressure at full braking effort, irrespectively of the vehicle being empty or laden.

To satisfy this requirement the system of Patent Application Ser. No. 860,233 provides a charging device controlled by a brake pressure limiting valve for charging the load brake cylinder. When the brake initially responds this charging device generates an initial pressure for overcoming the force of the restoring springs even when the vehicle is empty or only partly loaded.

The present invention proposes further to improve this arrangement by again relaxing the pressure in the load brake cylinder after the brake has initially responded.

An automatic compressed air brake system according to the invention for a vehicle which in use is dependent on the load of the vehicle comprises a control valve, an automatic compressed air brake system for a vehicle which in use is dependent on the load of the vehicle comprising a brake cylinder for braking the vehicle when unladen, a load brake cylinder, a brake block actuating linkage having restoring spring forces to operate said block which is acted upon by each of said cylinders, a pressure transmitter controlled by the load and by the pressure in the unladen brake cylinder connected to said load braking cylinder, a brake pressure limiting valve, means for charging said load brake cylinder controlled by said brake pressure limiting valve, said charging means generating on initial pressure in said load brake cylinder for balancing said restoring spring forces when braking commences irrespective of the load on the vehicle and means controllable by the pressure in said unladen brake cylinder for relieving said load brake cylinder.

Preferably the brake pressure limiting valve has a hollow tappet which communicates with atmosphere, and which is coupled by a lost motion coupling to the pressure in the unladen brake cylinder.

Figure 2:
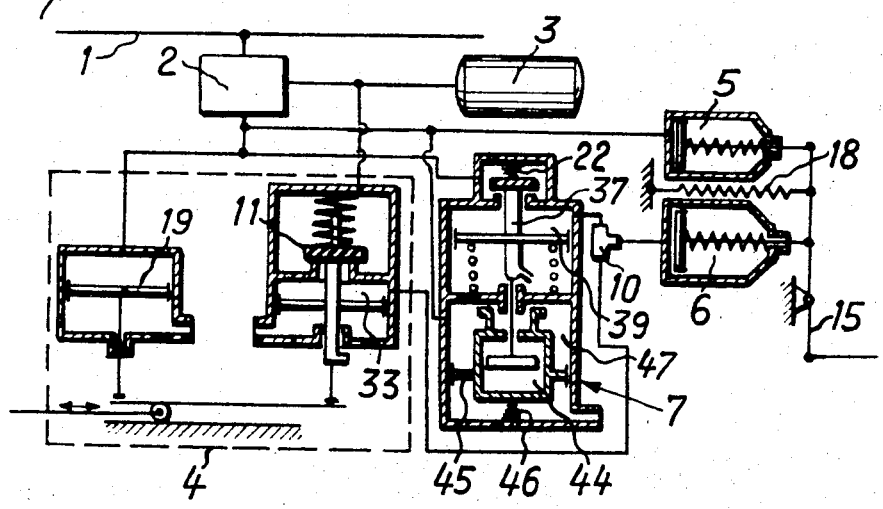

Two embodiments of a compressed air brake system according to the invention will be hereinafter described in greater detail, reference being made to the accompanying drawings in which:

FIG. 1 is a schematic representation of the layout of a first embodiment of a compressed air brake system according to the invention, and FIG. 2 is a second embodiment of a compressed air brake system according to the invention.

With reference to FIG. 1 a control valve 2, not shown in detail, is connected to a main brake line 1 running down the length of a train of railway wagons. The valve 2 is connected, to an auxiliary air reservoir 3 and, to an unladen brake cylinder 5. Likewise connected to the control valve 2 is a pressure transmitter comprising the parts shown enclosed in rectangle 4 shown in broken lines. This pressure transmitter 4 is also connected to the auxiliary air reservoir 3 and to a load brake cylinder 6. The unladen brake cylinder 5 and the load brake cylinder 6 are both arranged to operate a lever 15 which is coupled by an adjustable link 16 to a brake block 17. The lever is biased by a restoring spring 18 which biases the brake block 17 away from a wheel 14 when the brake is released.

The pressure transmitter 4 includes a cylinder 24 which is divided by a piston 19 into an upper chamber 25 and a lower chamber 26. The bottom chamber 26 is open to atmosphere, whereas the upper chamber 25 is connected to the control valve 2 and to the unladen brake cylinder 5. The piston 19 operates an admission valve 11 through a lever 20. The lever 20 is pivotally mounted on a movable roller 21 which moves further to the left or right depending on the wagon load so that the relative length of the two parts of the lever 20 to the left and right of the roller varies according to the wagon load. The roller is moved by means not shown in the drawing, which operate in a known manner. Thus the inlet valve 11 opens firstly according to the initial pressure developed by the control valve 2 and secondly by reference to the wagon load. The inlet valve 11 has a valve body 27 which is urged against its seating 28 by the biasing force of a spring 29. An upper chamber 30 of the valve 11 is in communication with the auxiliary reservoir 3. A piston 31 attached to a hollow tappet 32 divides the chamber below the valve body 27 into two compartments 33 and 34. The compartment 33 is connected to the load brake cylinder 6, whereas compartment 34 is open to atmosphere. The inlet valve 11 can be operated to increase the supply of compressed air to the load brake cylinder 6 from the auxiliary air reservoir 3.

The parts of the system so far described function as follows:

When the air pressure in the main brake line 1 is reduced the control valve 2 responds and admits a pressure of for example 0.8 kg/sq.cm. If the vehicle is unladen the roller 21 of the pressure transmitter will be in its left hand and position in FIG. 1. The pressure acting on piston 19 will not in such circumstances be sufficient to open the inlet valve 11. Hence the pressure from the control valve 2 will act exclusively on the unladen brake cylinder 5. Assuming the piston face in this cylinder to have an area of 180 sq.cm and the restoring force of the spring 18 to be 200 kg the resultant braking force of the brake piston will be 180 × 0.8 − 200 = −56 kg. In other words, when the vehicle is unladen the brake blocks will not be applied to the wheels. On the other hand, if the vehicle is fully laden so that the admission valve 11 opens at the above stated initial pressure, then the load cylinder will also be operated. Assuming the combined area of the two piston faces in the unladen and the load brake cylinders to be 900 sq.cm, the force of the spring 18 being unaltered at 200 kg, then the brake force developed will be 900 × 0.8 − 200 = 520 kg, i.e. 17.8 percent of the brake block pressure on full brake application at the maximum internationally prescribed brake cylinder pressure of 3.8 kg/sq.cm. If the initial pressure is raised from 0.8 kg/sq.cm to 1.2 kg/sq.cm a positive brake cylinder force of 180 × 1.2 − 200 = 16 kg will in fact now be obtained also when the vehicle is unladen and this will be augmented when the vehicle is fully laden by the additional operation of the load brake cylinder to 900 × 1.2 − 200 = 800 kg, i.e. to 29.7 percent of the maximum brake block pressure at full braking effort.

If long trains include empty as well as full laden wagons the different braking efforts that are developed lead to undesirable buffer reactions.

The elements that will now be described serve the purpose of keeping the resultant braking efforts at the brake blocks within the prescribed limits of about 6 to 15 percent of the maximum braking effort, irrespectively of the vehicle being empty or laden. For this purpose, as shown in the first embodiment, a brake pressure limiting valve 7 is connected with the control valve 2. This pressure limiting valve 7 includes a valve body 35 biased by a valve spring 22. The valve body 35 can rest on a valve seat 36 or on a hollow valve tappet 37. The hollow valve tappet 37 exhausts to atmosphere. The pressure limiting valve 7 is divided by the valve body 35 into an upper chamber 38 and a lower chamber 39. The upper chamber 38 communicates firstly with the control valve 2 and secondly with the unladen brake cylinder 5. The bottom chamber 39 communicates with a lower chamber 41 of an auxiliary cylinder 40 yet to be described. The chamber 39 is bounded by a piston 42 attached to the valve tappet 37. The piston 42 is biased by a spring 43 in the direction for opening the valve 7. A piston 45 is connected to the tappet 37 by a lost motion coupling 44. This piston is biased by a spring 46 and defines two chambers 47 and 48. The chamber 47 together with the above-mentioned chamber 38 is also connected to the unladen brake cylinder 5. The chamber 48 exhausts to atmosphere.

The auxiliary cylinder 40 contains a piston 8 which is coupled by a rod 49 to the tappet 32 of the inlet valve 11. The piston 8 divides the auxiliary cylinder into two chambers 41 and 13. The chamber 41, as already mentioned, communicates with the chamber 39 in the pressure limiting valve 7, whereas chamber 13 communicates through a choke bore 9 with the load brake cylinder 6.

The first embodiment functions as follows:

When an initial pressure is developed consequent upon a reduction in air pressure in the main brake line, air from the control valve 2 enters the chamber 39 of the open pressure limiting valve 7 as well as the chamber 41 in the auxiliary cylinder 40. The pressure limiting valve 7 remains open until the pressure in chamber 39 overcomes the biasing force of the spring 43 and forces the piston 42 downwards. The pressure in the chamber 41 of the auxiliary cylinder 40 displaces the piston 8 upwards and opens the inlet valve 11. Air from the auxiliary reservoir 3 now passes through the open inlet valve 11 into the load brake cylinder 6 so that brake application involves the application of air from the control valve 2 and from the auxiliary reservoir 3 not only to the unladen brake cylinder 5 but also to the load brake cylinder 6.

The brake pressure limiting valve 7 closes at a particular pressure of for example 0.3 to 0.4 kg/sq.cm, causing the inlet valve 11 also to close unless it is kept open by the effect of the load on the vehicle through the lever 20. The instant of closure of the inlet valve 11 is modified by the choke bore 9 by creating a build-up of pressure in the chamber 13 of the auxiliary cylinder 40 in order to achieve a rapid advance of the piston in the load brake cylinder to apply the brake blocks.

However, compressed air from the unladen brake cylinder 5 also enters the chamber 47 above the piston 45. As soon as the pressure in the chamber 47 overcomes the biasing force of the spring 46 the tappet 37 will be moved via the lost motion coupling 44 sufficiently for the chamber 39 to be exhausted through the hollow tappet 37 to atmosphere. The chamber 41 in the auxiliary cylinder 40 which communicates with the chamber 39 is thus likewise exhausted. The piston 8 moves downwards and exhausts chamber 33 of the inlet valve 11 so that the load brake cylinder 6 is likewise exhausted. In other words, at a specific or determined pressure in the unladen brake cylinder 5 when the vehicle is empty the load brake cylinder 6 will be exhausted to atmosphere.

The second embodiment shown in FIG. 2 differs from the first embodiment described with reference to FIG. 1 in that the auxiliary cylinder 40 is replaced by a two-way check valve 10 through which air can enter the load brake cylinder 6 from the auxiliary reservoir 3 and the control valve 2 both via the chamber 33 of the inlet valve 11 and the brake pressure limiting valve 7. In this second embodiment the brake pressure limiting valve 7 is of exactly the same construction as in the first embodiment. However, the chamber 39 of the valve 7 is connected directly to the load brake cylinder 6 by the two-way check valve 10. Therefore, when the chamber 39 in valve 7 is exhausted the load brake cylinder 6 will at once exhaust through the check valve 10.

The second embodiment functions as follows:

When the control valve 2 provides an initial pressure owing to the main air brake line 1 pressure having been reduced, the brake pressure limiting valve 7 remains open and the pressure from the valve 2 enters both the unladen and the load brake cylinders, the air in chamber 39 of the brake pressure limiting valve 7 entering the load brake cylinder 6 through the two-way check valve 10.

As soon as the pressure in the unladen brake cylinder has sufficiently risen for the pressure in chamber 47 — which is in communication with the unladen brake cylinder— to overcome the biasing force of the spring 46, the piston 45 will be downwardly displaced and through the lost motion coupling 44 will entrain the tappet 37 in the downward direction, allowing the chamber 39 and the load brake cylinder 6 to exhaust through the two-way check valve 10. Hence the load brake cylinder 6 will exhaust when the vehicle is empty, as in the first embodiment, as soon as the pressure in the unladen brake cylinder 5 has reached a predetermined level.

As described with reference to the first embodiment the brake pressure limiting valve 7 closes at a pressure of 0.2 to 0.4 kg/sq.cm and then stops the further admission of air into the load brake cylinder. If the pressure rises further i.e. if the braking effort is intensified, the further admission of air into the load brake cylinder 6 proceeds according to the vehicle load through the inlet valve 11 of the pressure transmitter 4 and the check valve in its changed-over position.

I claim:

1. An automatic compressed air brake system for a vehicle which in use is dependent on the load of the vehicle, said system comprising a brake cylinder for braking the vehicle when unladen, a load brake cylinder, a brake block actuating linkage having restoring spring forces to operate said block which is acted upon by each of said cylinders, a pressure transmitter controlled by the load and by the pressure in the unladen brake cylinder connected to said load braking cylinder, a brake pressure limiting valve, means for charging said load brake cylinder controlled by said brake pressure limiting valve, said charging means generating on initial pressure in said load brake cylinder for balancing said restoring spring forces when braking commences irrespective of the load on the vehicle, a hollow valve tappet in communication with atmosphere positioned within said brake pressure limiting valve, a lost motion coupling coupled to said tappet, and a piston attached to said coupling and subject to the pressure in said unladen brake cylinder for relieving said load brake cylinder.

2. A brake system as claimed in claim 1 wherein said piston is in a chamber which is in communication directly with said unladen brake cylinder.

3. A brake system as claimed in claim 1 wherein said piston is in communication with said unladen brake cylinder through said brake pressure limiting valve.

4. In a railway wagon an automatic compressed air braking system which is dependent on the load on the vehicle said system comprising a brake cylinder for braking the vehicles when unladen, a load brake cylinder, a brake block, a brake actuating linkage having restoring spring forces to operate said block which is acted upon by each of said cylinders, a pressure transmitter controlled by the load and by the pressure in the unladen brake cylinder connected to said load braking cylinder, a brake pressure limiting valve, means for charging said load brake cylinder controlled by said brake pressure limiting valve, said charging means generating an initial pressure in said load brake cylinder for balancing said restoring spring forces when braking commences irrespective of the load of the vehicle, and means for relieving said load brake cylinder including a hollow valve tappet in communication with atmosphere positioned within said brake pressure limiting valve, a lost motion coupling coupled to said tappet, and a piston attached to said coupling and subject to the pressure in said unladen brake cylinder.

* * * * *